United States Patent [19]

Mizusaki

[11] 4,291,590
[45] Sep. 29, 1981

[54] MECHANISM FOR MOUNTING SIDE MIRRORS TO THE MASTER CYLINDER FOR MOTOR BICYCLES

[75] Inventor: Yoshinobu Mizusaki, Ueda, Japan

[73] Assignee: Nisshin Kogyo Kabushiki Kaisha, Nagano, Japan

[21] Appl. No.: 59,566

[22] Filed: Jul. 20, 1979

[30] Foreign Application Priority Data

Jul. 28, 1978 [JP] Japan .......................... 53-103980[U]

[51] Int. Cl.³ .............................................. B60R 1/12
[52] U.S. Cl. ............................. 74/551.8; 280/289 H; 350/307
[58] Field of Search ................... 280/289 H; 180/219; 350/307; 188/344; 74/551.8; 248/475

[56] References Cited

FOREIGN PATENT DOCUMENTS

| | | | |
|---|---|---|---|
| 2727951 | 1/1979 | Fed. Rep. of Germany | 74/551.8 |
| 1089110 | 3/1955 | France | 280/289 H |
| 745061 | 2/1956 | United Kingdom | 188/344 |
| 1172382 | 11/1969 | United Kingdom | 350/307 |

*Primary Examiner*—John A. Pekar
*Attorney, Agent, or Firm*—Cantor and Singer

[57] ABSTRACT

A mechanism for mounting a side mirror to a master cylinder for a motor bicycle in which a side mirror-mounting portion is formed on a handle-mounting member by which the body of a master cylinder is fixed to a handle bar. Such a mirror-mounting portion may be defined by a boss portion in integral relation to a handle-mounting member. Use may be made of the boss portion of any structure capable of retaining a side mirror-mounting shaft.

2 Claims, 2 Drawing Figures

MECHANISM FOR MOUNTING SIDE MIRRORS TO THE MASTER CYLINDER FOR MOTOR BICYCLES

BACKGROUND OF THE INVENTION

The present invention generally relates to a mechanism for mounting a side mirror to a master cylinder for a motor bicycle.

Heretofore, the side mirror was mounted to a specific portion of the body of a master cylinder. However, such a construction of the type wherein the body of a master cylinder is specifically provided as an integral piece with a side mirror-mounting portion resulted in an unnecessarily increased length of the body of a master cylinder due to the addition of such a specific portion or an increased height of a reservoir required for reserving a suitable amount of liquid. Furthermore, manufacturing of the body of a master cylinder by molding was disadvantageous in that the side mirror-mounting portion defined by a boss was subjected to poor molding. In addition, if the side mirror-mounting shaft was bent in the mirror-mounting portion due to a shock caused by an accident such as turn-over or collision of a motor bicycle, the entire body of master cylinder had to be replaced. Such replacement of the entire body had to be accomplished by the overall steps including initial steps of mounting the body and removing air etc., thus needing a great deal of cost and work.

SUMMARY OF THE INVENTION

In order to overcome the above-mentioned defects, the present invention provides a mechanism for mounting a side mirror to a master cylinder for a motor bicycle characterized in that a side mirror-mounting portion is formed on a handle-mounting member by which the body of a master cylinder is fixed to a handle bar. A main object of the present invention is therefore to provide such a side mirror-mounting mechanism formed on the handle-mounting member rather than on the body of a master cylinder, whereby the mechanism is free from any limitation brought about by the configuration of the body of a master cylinder as well as the shape and position of the reservoir and the body of a master cylinder is easily manufactured. In addition, even when it is impossible to remove the side mirror-mounting shaft which is bent within the mirror-mounting portion, elimination of such a shaft may merely be accomplished by replacement of the handle-mounting member without the need of replacing the entire body of a master cylinder.

BRIEF DESCRIPTION OF THE DRAWINGS

Other objects and advantages will be apparent from the following description taken in connection with the drawings in which.

DESCRIPTION OF THE PREFERRED EMBODIMENT

Figure 1:
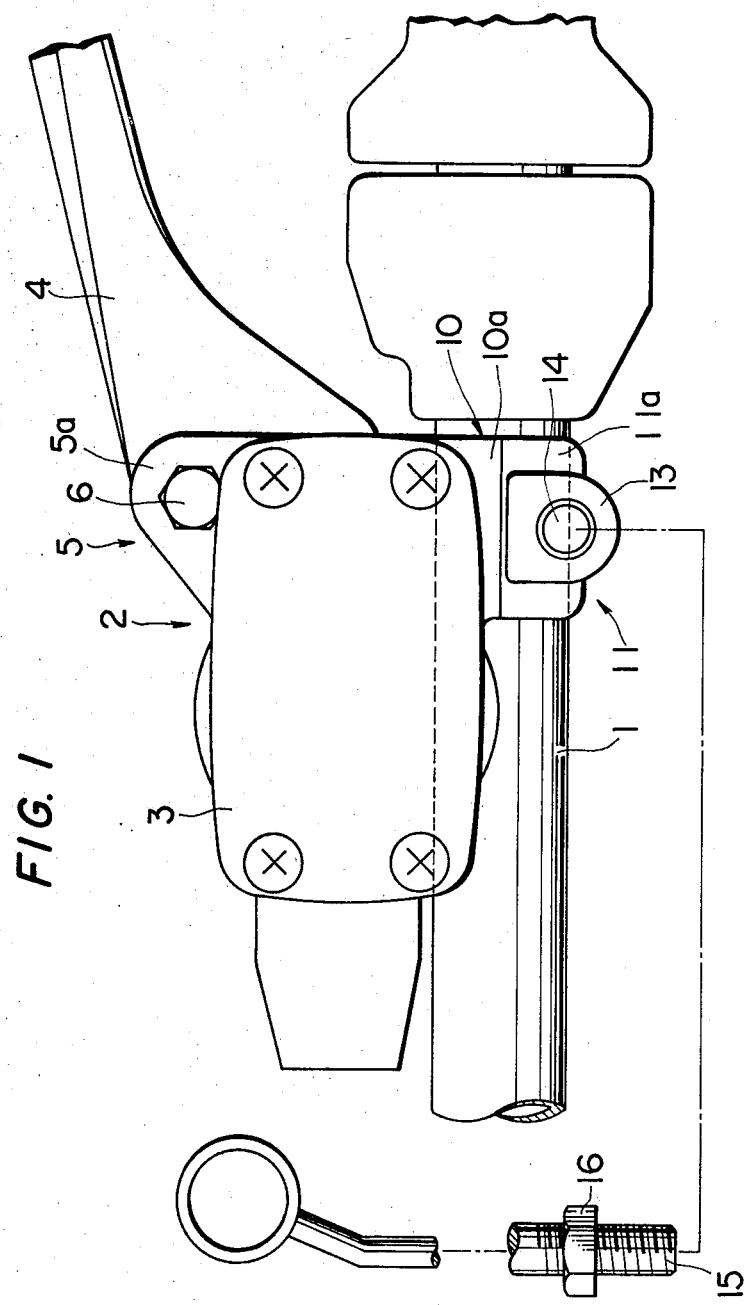
FIG. 1 is a top view of one preferred embodiment according to the present invention.
Figure 2:
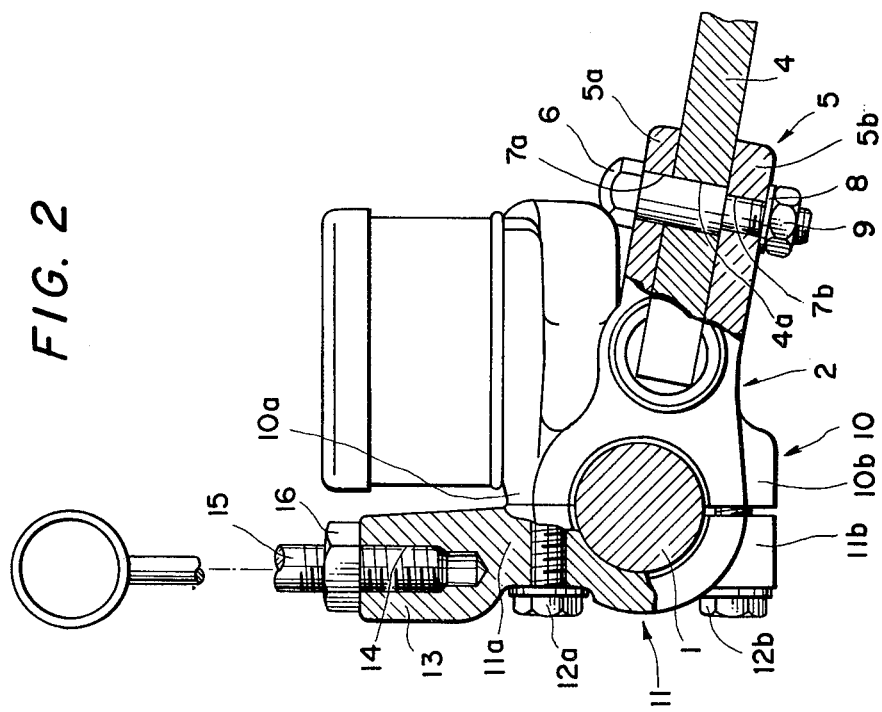
FIG. 2 is a sectional view, partially cut away, of the same.

Referring to the drawings, there is shown a preferred embodiment according to the present invention wherein numeral reference 1 is a handle bar, 2 the body of a master cylinder, 3 a reservoir formed on the body 2, and 4 an operating lever which is rotatively supported on a lever bolt 6 by inserting it in between an upper arm 5a and a lower arm 5b of a lever-mounting portion 5 bifurcated on the body 2 and passing the bolt 6 through a bore 7a in the upper arm 5a, a bore 4a in the lever 4 and a bore 7b in the lower arm 5b for threaded engagement with the portion 5 through a washer 8 and nut 9.

A handle-mounting portion generally indicated at 10 is formed on the body 2 of a master cylinder, having an upper arm 10a and a lower arm 10b between which is sandwiched the handle bar 1. A handle-mounting member, which is generally shown at 11, has an upper arm 11a and a lower arm 11b between which is sandwiched the handle bar 1. These upper and lower arms 11a and 11b correspond to the upper and lower arms 10a and 10b formed on the side of the body 2, respectively. The handle-mounting member 11 is fixed to the handle-mounting portion 10 on the side of the body 2 through the handle bar 1 by fixing bolts 12a and 12b. Numeral reference 13 stands for a side mirror boss formed on the member 11 in integral relation. A side mirror-mounting shaft 15 is threaded into a bore 14 formed in the boss portion 13 to which is, in turn, fixed the shaft 15 by a nut 16.

While in the foregoing embodiment the side mirror-mounting portion formed on the handle-mounting member 11 is defined by the boss portion 13, it will be understood that the present invention is not limited to such a mirror boss and is therefore applicable to the side mirror-mounting portion of any structure capable of retaining the side mirror-mounting shaft 15.

As mentioned above, the side mirror boss portion is formed on the handle-mounting member 11 by which the handle-mounting portion 10 on the side of the body 2 of a master cylinder is fixed to the handle bar 1 rather than on the body 2, thus eliminating an unnecessarily increased length of the body of a master cylinder due to the addition of any specific mirror-mounting portion or an increased height of the reservoir required for reserving a suitable amount of liquid. Accordingly, no limitation is placed on the configuration of the body of a master cylinder as well as the shape and position of the reservoir, thus making manufacturing of the body of a master cylinder easy. In addition, even when it is impossible to remove the side mirror-mounting shaft which is bent within the mirror-mounting portion elimination of such a shaft can be accomplished only by replacement of the handle-mounting member at a low cost and with a less amount of work.

While one preferred embodiment of the present invention has been shown and described, it will be understood that various modifications may be made within the spirit and scope of the invention which therefore should be limited only by the appended claims.

What is claimed is:

1. A side mirror-mounting mechanism for mounting a brake master cylinder and a side mirror to a motorcycle handle bar wherein said master cylinder comprises a body having a handle mounting portion adapted to mount on said handle bar and embrace the same between an upper arm and a lower arm defining a semi-circular handle bar gripping surface therebetween, said mechanism comprising a handle mounting member which comprises an upper arm and a lower arm defining a semi-circular handle bar gripping surface therebetween and adapted to mate with said first-mentioned arms while embracing said handle bar therebetween, and means integral with said handle mounting member for mounting said mirror thereto at least partially sideward of above said handle bar. pg,8

2. A side mirror-mounting mechanism as claimed in claim 1, wherein said mirror-mounting means is defined by a boss portion.

* * * * *